United States Patent
Huber et al.

(10) Patent No.: US 9,594,581 B2
(45) Date of Patent: *Mar. 14, 2017

(54) MODULAR VIRTUAL MACHINE SERVER

(75) Inventors: Gary Douglas Huber, Austin, TX (US); Kevin A. Kettler, Austin, TX (US); Yuan-Chang Lo, Austin, TX (US); William Dale Todd Nix, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1581 days.

This patent is subject to a terminal disclaimer.

(21) Appl. No.: 12/183,513

(22) Filed: Jul. 31, 2008

(65) Prior Publication Data

US 2010/0031255 A1 Feb. 4, 2010

(51) Int. Cl.
*G06F 9/455* (2006.01)
*G06F 9/445* (2006.01)

(52) U.S. Cl.
CPC ............ *G06F 9/45558* (2013.01); *G06F 8/61* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 7,251,813 B2 | 7/2007 | Kosuge | |
| 7,467,292 B2 | 12/2008 | Raley et al. | |
| 7,584,282 B2 | 9/2009 | Reeves et al. | |
| 7,974,606 B2 | 7/2011 | Lo et al. | |
| 8,239,509 B2 | 8/2012 | Ferris et al. | |
| 2002/0049608 A1 | 4/2002 | Hartsell et al. | |
| 2002/0049841 A1 | 4/2002 | Johnson et al. | |
| 2002/0059274 A1 | 5/2002 | Hartsell et al. | |
| 2002/0065864 A1 | 5/2002 | Hartsell et al. | |
| 2002/0095400 A1 | 7/2002 | Johnson et al. | |
| 2002/0120741 A1 | 8/2002 | Webb et al. | |
| 2002/0152305 A1 | 10/2002 | Jackson et al. | |
| 2002/0166117 A1 | 11/2002 | Abrams et al. | |
| 2003/0018746 A1 | 1/2003 | Boesch | |
| 2003/0135385 A1 | 7/2003 | Karpoff | |
| 2003/0236745 A1 | 12/2003 | Hartsell et al. | |
| 2004/0093381 A1 | 5/2004 | Hodges et al. | |
| 2005/0055688 A1 | 3/2005 | Barajas et al. | |
| 2006/0182253 A1 | 8/2006 | Capotosto et al. | |
| 2006/0184935 A1 | 8/2006 | Abels et al. | |
| 2007/0078988 A1 | 4/2007 | Miloushev et al. | |
| 2008/0040716 A1* | 2/2008 | Lam et al. ................. 718/1 |
| 2008/0126834 A1 | 5/2008 | Sankaran et al. | |

(Continued)

*Primary Examiner* — Gregory A Kessler
(74) *Attorney, Agent, or Firm* — Terrile, Cannatti, Chambers & Holland, LLP; Stephen A. Terrile

(57) ABSTRACT

A simple to customize IT infrastructure architecture. The IT infrastructure architecture includes a general-purpose virtualized architecture platform. The IT infrastructure architecture is well suited for delivering simple pre-packaged software solutions to the small business segment as plug and play type appliances. In certain preferred embodiments, the IT infrastructure architecture includes a virtual appliance memory device such as a virtual appliance universal serial bus (USB) key. The IT infrastructure architecture uses embedded server virtualization technology to host business applications as a virtual appliance.

13 Claims, 5 Drawing Sheets

(56) References Cited

U.S. PATENT DOCUMENTS

| | | | |
|---|---|---|---|
| 2008/0307414 A1* | 12/2008 | Alpern et al. | 718/1 |
| 2009/0060187 A1 | 3/2009 | Doyle et al. | |
| 2009/0210869 A1* | 8/2009 | Gebhart et al. | 717/174 |
| 2009/0276771 A1* | 11/2009 | Nickolov et al. | 717/177 |
| 2010/0011358 A1 | 1/2010 | Kettler et al. | |
| 2010/0027441 A1 | 2/2010 | Curtis et al. | |
| 2010/0050210 A1 | 2/2010 | Quinn et al. | |

\* cited by examiner

MODULAR VIRTUAL MACHINE SERVER

CROSS REFERENCE TO RELATED APPLICATIONS

This application relates to application Ser. No. 12/172,544, filed Jul. 14, 2008, entitled "Virtualization Based Personalizable Consumer Electronics Platform" and naming Kevin Kettler and Shree A. Dandekar as inventors, and Ser. No. 12/354,446, filed Jan. 15, 2009, entitled "System for Enabling Virtual Services on a Business and a Consumer Device" and naming Kevin Kettler, Yuang-Chang Lo, and Shree A. Dandekar as inventors, the applications being incorporated herein by reference in their entireties.

BACKGROUND OF THE INVENTION

Field of the Invention

The present invention relates to information handling systems and more particularly to a modular virtual machine server.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue relating to information handling systems is often businesses such as small businesses lack the skills manage a complex information technology (IT) infrastructure. Additionally, businesses such as small business are often space constrained to have many large server type information handling systems. Many businesses also would prefer to start with a smaller IT infrastructure but wish to preserve the ability to expand the IT infrastructure as the business grows.

Accordingly, it would be desirable to provide an easily manageable and expandable array of server based functions to businesses or consumers with limited or no IT capabilities.

SUMMARY OF THE INVENTION

In accordance with the present invention, a simple-to-customize IT infrastructure architecture is provided. The IT infrastructure architecture includes a general-purpose virtualized x86 architecture platform. The IT infrastructure architecture is well suited for delivering simple pre-packaged software solutions to the small business segment as plug-and-play type appliances. In certain preferred embodiments, the IT infrastructure architecture includes a virtual appliance memory device such as a virtual appliance universal serial bus (USB) key. The IT infrastructure architecture uses embedded server virtualization technology to host business applications as a virtual appliance. Additionally, in certain embodiments, the IT functionality can be expanded by adding new or different VM keys without having to buy new hardware or software.

More specifically, in one embodiment, the invention relates to a method for delivering pre-packaged software solutions to an information handling system. The method includes providing a virtual machine (VM) host comprising a plurality of VM resources operable to execute virtual machines, providing a virtual appliance memory device that comprises a virtual appliance stored on the virtual appliance memory device where the virtual appliance includes an application, installing the virtual appliance onto the virtual machine host via the virtual appliance memory device, and hosting the application via the virtual appliance.

In another embodiment, the invention relates to an apparatus for delivering pre-packaged software solutions to an information handling system. The system includes a virtual machine (VM) host comprising a plurality of VM resources operable to execute virtual machines, a virtual appliance memory device that includes a virtual appliance stored on the virtual appliance memory device where the virtual appliance includes an application, means for installing the virtual appliance onto the virtual machine host via the virtual appliance memory device, and means for hosting the application via the virtual appliance.

In another embodiment, the invention relates to an information handling system that includes a virtual appliance memory device for delivering pre-packaged software solutions to the information handling system where the virtual appliance memory device comprises a virtual appliance which includes an application, stored on the virtual appliance memory device and a virtual machine (VM) host comprising a plurality of VM resources operable to execute virtual machines where the virtual machine host installs the virtual appliance onto the virtual machine host via the virtual appliance memory device and hosts the application via the virtual appliance.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
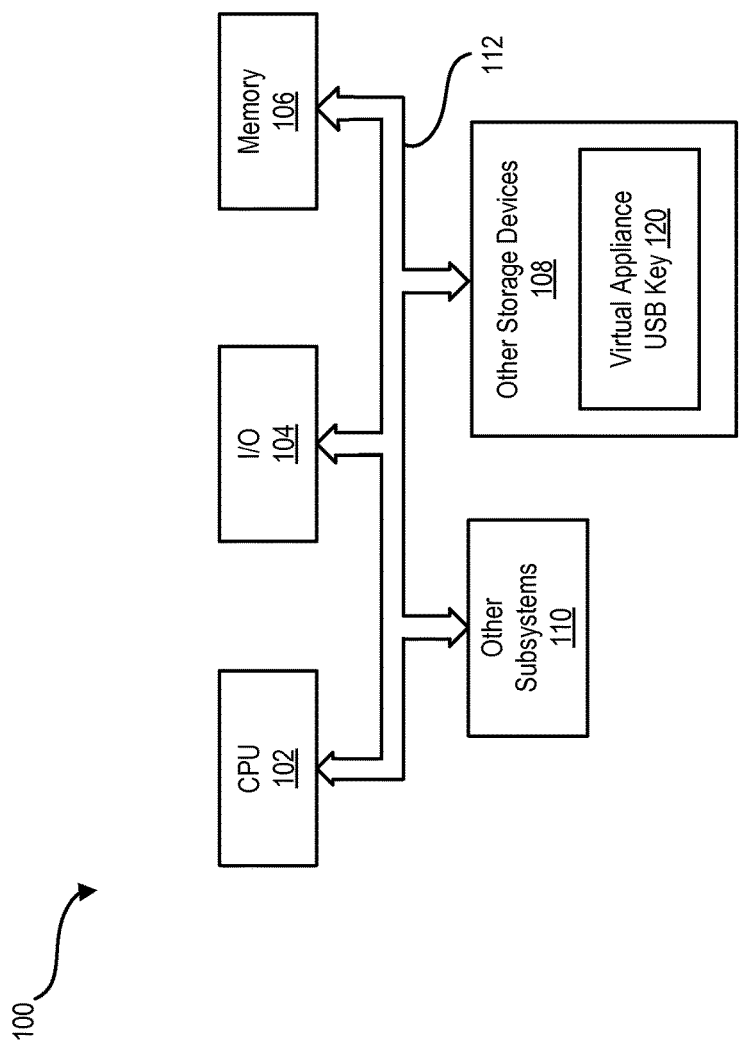
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. One example of another storage device 108 is a virtual appliance memory device such as a virtual appliance USB key 120.

The virtual appliance USB key 120 can include one or a plurality of virtual appliances. Each virtual appliance is a self-contained virtual machine that implements a business solution (including an operating system (OS), and application and a default configuration). Examples of self-contained virtual machines can include a voice over internet protocol (VoIP) server, an email server, a digital signage solution, a surveillance tool, a background music server, a business accounting solution, a point of sale (POS) solution. Because the virtual machines are self-contained and isolated using virtualization technology, each solution can be preconfigured and ready to use, without a customer having to install and configure the solution.

Figure 2:
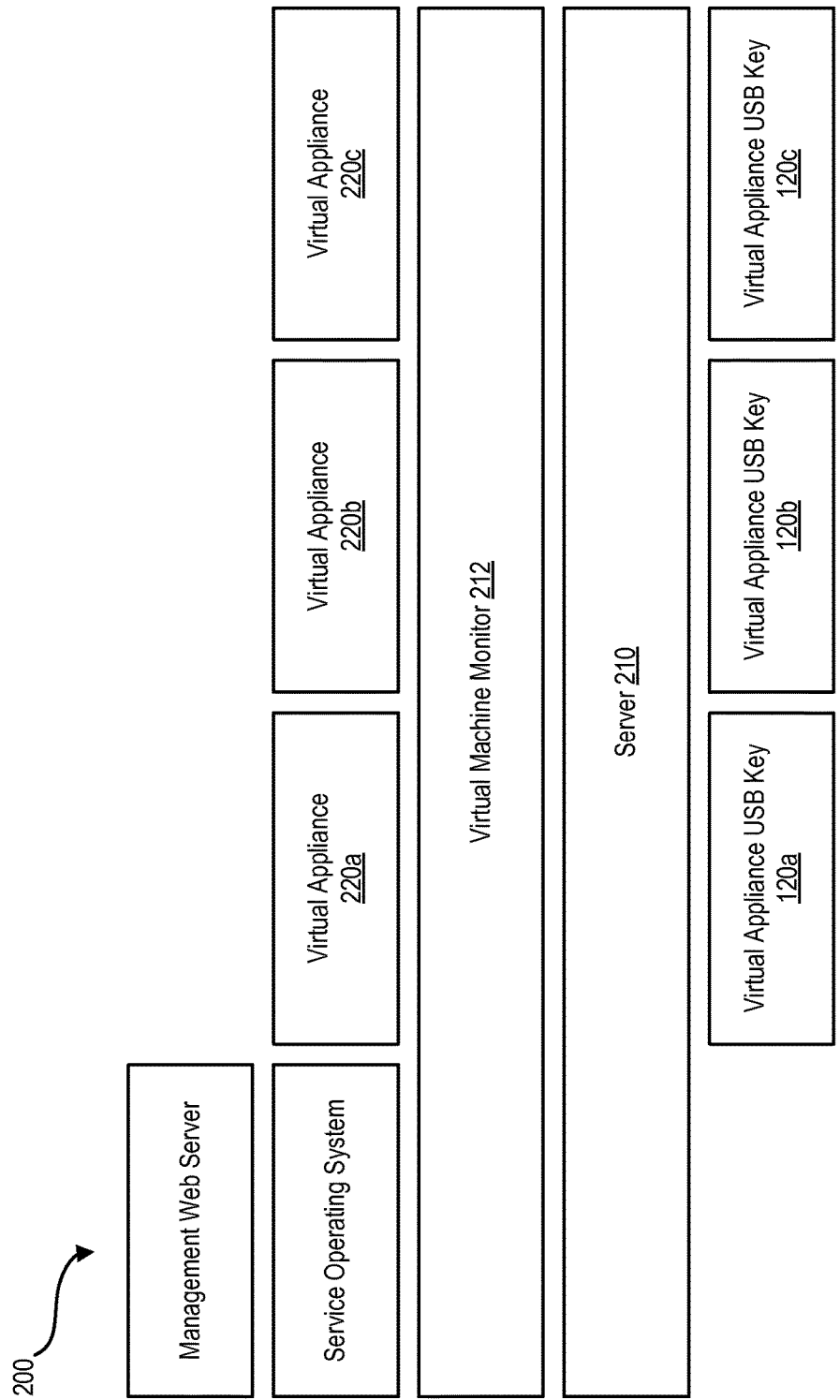
FIG. 2 shows a system block diagram of an IT infrastructure architecture.

Each of the virtual appliances is installed on the information handling system 100 via a respective virtual appliance USB key 120. Using a virtual appliance USB key 120 not only simplifies an initial installation, but also subsequent need to move the virtual machine if the capacity of the server is exceeded. FIG. 2 shows the architecture diagram of the virtual server.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 2, a system block diagram of an IT infrastructure architecture 200 is shown. More specifically, a server type information handling system 210 executes a virtual machine monitor application 212. The IT infrastructure architecture 200 also includes a service operation system 214 and a management web server 218 which are executed by the server 210.

One or more virtual appliance USB keys 120a, 120b, and/or 120c may be coupled to the server 210. Each of the USB keys 120 allow a self contained virtual appliance 220 to be installed on the server 210. In certain embodiments, a digital certificate of authenticity (COA) is included with each virtual appliance 220. The COA is checked by the virtual server 210 before the appliance is installed onto the virtual server 210.

A data structure with computing resource requirements is included with each virtual appliance on the USB key. These include CPU requirements, memory requirements, storage requirements, and network bandwidth requirements. Before a virtual appliance is installed, the virtual server ensures that it has enough capacity to host the appliance. The server also contains a resource meter (which may be located on a panel of the server) to represent current resource capacity and remaining resource capacity to simplify capacity planning.

Figure 3:
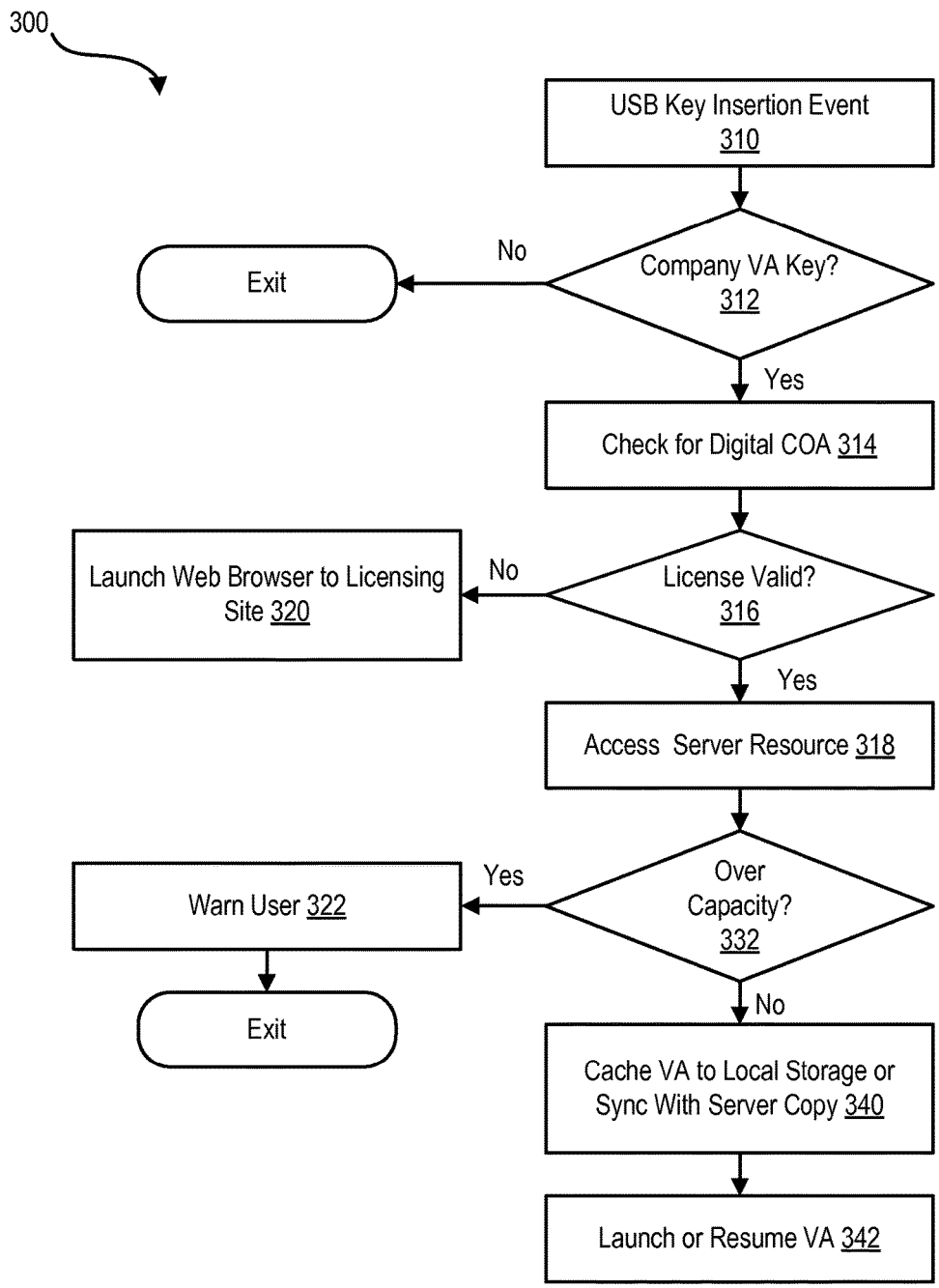
FIG. 3 shows a flow chart of the operation of a modular virtual machine server IT infrastructure architecture.

Referring to FIG. 3, a flow chart of the operation of a virtual appliance installation module 300 is shown. More specifically, when the server 210 detects a USB key insertion event at step 310, the virtual server 210 determines whether the USB key is an authorized virtual appliance (VA) key (e.g., does the VA key correspond to a particular business) at step 312. If the key is not an authorized key, then the virtual appliance installation operation exits. If the key is an authorized key, then the virtual server 210 analyzes the digital certificate of authenticity at step 314 and determines whether the virtual appliance includes a valid license at step 316. If the license is not valid, then the virtual appliance installation operation launches a web browser to access a virtual appliance licensing set at step 320.

If the license is valid, then the virtual appliance installation operation accesses the resources of the server at step 318. The virtual appliance installation operation then determines whether the server 210 is over capacity at step 332 based upon the available resources of the server 210 as well as the resources needed by the virtual appliance. If the server 210 is over capacity then the virtual appliance installation operation warns the user at step 334. If the resource of the virtual server is exceeded (e.g., as determined by step 332), the user is warned by a front panel indicator of this condition. The user may proceed with a number of options. The user can ignore the warning and leave the USB key in the system, in which case the system performance may degrade. Alternately, the user may remove the USB key from the system and insert the key into another system with more system resource capacity.

If the server 210 is not over capacity then the virtual appliance installation operation caches the virtual appliance to local storage or synchronizes the virtual appliance with a server copy at step 340. Next, the virtual appliance installation operation launches or resumes operation of the virtual appliance at step 342.

Figure 4:
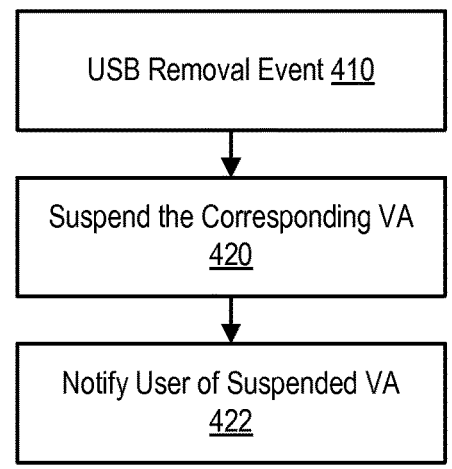
FIG. 4 shows a flow chart of the operation of a modular virtual machine server IT infrastructure architecture.

Referring to FIG. 4, a flow chart of the operation of a virtual appliance removal module 400 is shown. More specifically, when the server 210 detects a USB key removal event at step 410, the virtual server 210 suspends execution of the virtual appliance that corresponds to the removed key at step 420 and generates a notification of the suspended virtual appliance at step 422. The front panel of the virtual machine server also indicates the removal of the key.

Figure 5:
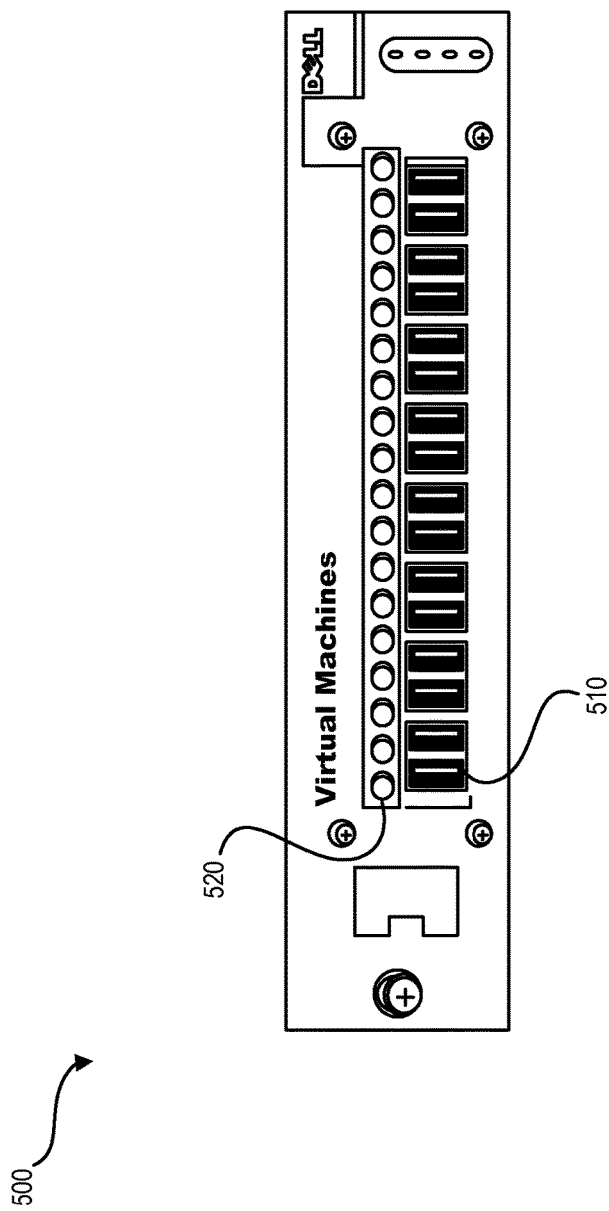
FIG. 5 shows a conceptual view of a panel of a modular virtual machine server type information handling system.

Referring to FIG. 5, a conceptual view of a panel 500 of a modular virtual machine server type information handling system is shown. More specifically, the panel 500 includes a plurality of USB connections 510. Each USB connection includes a corresponding connection indication 520. The USB connection indication 520 can include indicia (e.g., a color indication) of whether a virtual appliance is installed and executing on the server 210.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the virtual appliance memory device 120 may function as a license and resource management token and not necessarily as a storage device for the virtual appliance.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for delivering pre-packaged software solutions to an information handling system comprising:
   providing a virtual machine (VM) host comprising a plurality of VM resources operable to execute virtual machines;
   providing a virtual appliance memory device, the virtual appliance memory device comprising a virtual appliance stored on the virtual appliance memory device, the virtual appliance comprising an application, the application corresponding to a pre-packaged software solution;
   installing the virtual appliance onto the virtual machine host via the virtual appliance memory device; and
   hosting the application via the virtual appliance so as to facilitate delivery of pre-packaged software solutions to the information handling system; wherein,
   the pre-packaged software solutions provided via the virtual appliance memory device are preconfigured and ready to use without a customer having to install and configure to solution;
   the virtual appliance memory device comprises a virtual appliance universal serial bus (USB) key, the virtual appliance USB key comprising a data structure with resource requirements with the virtual appliance on the virtual appliance USB key.

2. The method of claim 1 wherein:
   the application comprises at least one of a voice over internet protocol (VoIP) application, an email application, a digital signage application, a surveillance application, a background music application, a business accounting application and a point of sale (POS) application.

3. The method of claim 1 wherein:
   the virtual appliance comprises a digital certificate of authenticity; and further comprising:
   checking the validity of the certificate of authenticity when the appliance is installed onto the virtual machine host.

4. The method of claim 1 further comprising:
   analyzing a resource capacity of the virtual machine host; and
   installing the virtual appliance only when the virtual machine host has enough capacity to host the application, the capacity comprising processor requirements, memory requirements, storage requirements and network bandwidth requirements.

5. An apparatus for delivering pre-packaged software solutions to an information handling system comprising:
   a virtual machine (VM) host comprising a plurality of VM resources operable to execute virtual machines;
   a virtual appliance memory device, the virtual appliance memory device comprising a virtual appliance stored on the virtual appliance memory device, the virtual appliance comprising an application, the application corresponding to a pre-packaged software solution;
   means for installing the virtual appliance onto the virtual machine host via the virtual appliance memory device; and
   means for hosting the application via the virtual appliance so as to facilitate delivery of pre-packaged software solutions to the information handling system; wherein,
   the pre-packaged software solutions provided via the virtual appliance memory device are preconfigured and ready to use without a customer having to install and configure to solution;
   the virtual appliance memory device comprises a virtual appliance universal serial bus (USB) key, the virtual appliance USB key comprising a data structure with resource requirements with the virtual appliance on the virtual appliance USB key.

6. The apparatus of claim 5 wherein:
   the application comprises at least one of a voice over internet protocol (VoIP) application, an email application, a digital signage application, a surveillance application, a background music application, a business accounting application and a point of sale (POS) application.

7. The apparatus of claim 5 wherein:
   the virtual appliance comprises a digital certificate of authenticity; and further comprising:
   means for checking the validity of the certificate of authenticity when the appliance is installed onto the virtual machine host.

8. The apparatus of claim 5 further comprising:
   means for analyzing a resource capacity of the virtual machine host; and
   means for installing the virtual appliance only when the virtual machine host has enough capacity to host the application, the capacity comprising processor requirements, memory requirements, storage requirements and network bandwidth requirements.

9. An information handling system comprising:
a virtual appliance memory device for delivering pre-packaged software solutions to the information handling system, the virtual appliance memory device comprising a virtual appliance stored on the virtual appliance memory device, the virtual appliance comprising an application, the application corresponding to a pre-packaged software solution, the virtual appliance comprising a digital certificate of authenticity;
a virtual machine (VM) host comprising a plurality of VM resources operable to execute virtual machines, the virtual machine host installing the virtual appliance onto the virtual machine host via the virtual appliance memory device and hosting the application via the virtual appliance so as to facilitate delivery of pre-packaged software solutions to the information handling system; wherein,
the pre-packaged software solutions provided via the virtual appliance memory device are preconfigured and ready to use without a customer having to install and configure to solution;
the virtual appliance memory device comprises a virtual appliance universal serial bus (USB) key, the virtual appliance USB key comprising a data structure with resource requirements with the virtual appliance on the virtual appliance USB key.

10. The information handling system of claim 9 wherein:
the application comprises at least one of a voice over internet protocol (VoIP) application, an email application, a digital signage application, a surveillance application, a background music application, a business accounting application and a point of sale (POS) application.

11. The information handling system of claim 9 wherein:
the virtual appliance comprises a digital certificate of authenticity; and
the virtual machine host checks the validity of the certificate of authenticity when the appliance is installed onto the virtual machine host.

12. The information handling system of claim 9 wherein the virtual machine host:
analyzes a resource capacity of the virtual machine host; and
installs the virtual appliance only when the virtual machine host has enough capacity to host the application, the capacity comprising processor requirements, memory requirements, storage requirements and network bandwidth requirements.

13. A method for delivering pre-packaged software solutions to an information handling system comprising:
providing a virtual machine (VM) host comprising a plurality of VM resources operable to execute virtual machines;
providing a virtual appliance memory device, the virtual appliance memory device comprising a virtual appliance stored on the virtual appliance memory device, the virtual appliance comprising an application, the application corresponding to a pre-packaged software solution;
installing the virtual appliance onto the virtual machine host via the virtual appliance memory device;
hosting the application via the virtual appliance so as to facilitate delivery of pre-packaged software solutions to the information handling system;
checking the validity of a certificate of authenticity when the appliance is installed onto the virtual machine host;
analyzing a resource capacity of the virtual machine host; and
installing the virtual appliance only when the virtual machine host has enough capacity to host the application, the capacity comprising processor requirements, memory requirements, storage requirements and network bandwidth requirements; wherein,
the pre-packaged software solutions are preconfigured and ready to use without a customer having to install and configure to solution;
the virtual appliance memory device comprises a virtual appliance universal serial bus (USB) key, the virtual appliance USB key comprising a data structure with resource requirements with the virtual appliance on the virtual appliance USB key.

\* \* \* \* \*